(12) United States Patent
Beck et al.

(10) Patent No.: US 11,087,894 B2
(45) Date of Patent: Aug. 10, 2021

(54) MITIGATION ASSEMBLY FOR NUCLEAR REACTOR COMPRISING A REMOVABLE SEALING PLUG

(71) Applicant: Commissariat A L'Energie Atomique et aux Energies Alternatives, Paris (FR)

(72) Inventors: Thierry Beck, Pierrevert (FR); Jean-Claude Garnier, Aix en Provence (FR); Denis Lorenzo, Manosque (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 623 days.

(21) Appl. No.: 16/030,894

(22) Filed: Jul. 10, 2018

(65) Prior Publication Data

US 2019/0019585 A1 Jan. 17, 2019

(30) Foreign Application Priority Data

Jul. 13, 2017 (FR) .................................... 17 56680

(51) Int. Cl.
*G21C 9/016* (2006.01)
*G21C 5/10* (2006.01)
(Continued)

(52) U.S. Cl.
CPC .............. *G21C 9/016* (2013.01); *G21C 1/02* (2013.01); *G21C 3/30* (2013.01); *G21C 3/322* (2013.01);
(Continued)

(58) Field of Classification Search
CPC .......... G21C 9/016; G21C 9/02; G21C 9/022; G21C 1/02; G21C 1/03
See application file for complete search history.

(56) References Cited

U.S. PATENT DOCUMENTS 3,816,247 A * 6/1974 Cayol ................... G21C 3/324
376/445
4,352,778 A * 10/1982 Arnaud ................. G21C 3/322
376/365
(Continued)

FOREIGN PATENT DOCUMENTS

FR 3 030 860 A1 6/2016

OTHER PUBLICATIONS

French Preliminary Search Report dated Mar. 14, 2018 in French Application 17 56680, filed on Jul. 13, 2017 ( with English Translation of Categories of Cited Documents).

Primary Examiner — Sharon M Davis
(74) Attorney, Agent, or Firm — Oblon, McClelland, Maier & Neustadt, L.L.P.

(57) ABSTRACT

A mitigation assembly for a nuclear reactor including a box with an upper portion forming the head of the assembly housing an upper neutron shielding device, including a head including removable lock and a slug installed free to move in translation relative over a given travel distance, the lock being configured such that locking/unlocking between the head and the box can be made by displacement of the slug with an extraction grab with its pawls attached in the slug. The lower part of the upper neutron shielding device includes a cone-shaped sealing block with the tip of the cone oriented downwards, cooperating with a cone-shaped internal surface of the box, a sealing device being formed between the two, the assembly created forming a removable sealing plug.

10 Claims, 7 Drawing Sheets

(51) Int. Cl.
*G21C 1/02* (2006.01)
*G21C 3/322* (2006.01)
*G21C 13/06* (2006.01)
*G21C 3/335* (2006.01)
*G21C 3/334* (2006.01)
*G21C 3/326* (2006.01)
*G21C 3/30* (2006.01)
G21C 1/32 (2006.01)
G21C 1/03 (2006.01)

(52) U.S. Cl.
CPC ............. *G21C 3/326* (2013.01); *G21C 3/334* (2013.01); *G21C 3/335* (2013.01); *G21C 5/10* (2013.01); *G21C 13/06* (2013.01); G21C 1/03 (2013.01); G21C 1/32 (2013.01)

(56) References Cited

U.S. PATENT DOCUMENTS

| | | | | |
|---|---|---|---|---|
| 4,493,813 | A * | 1/1985 | Loriot | G21C 11/024 376/409 |
| 4,948,555 | A * | 8/1990 | Limouzin | G21C 3/322 376/352 |
| 2012/0201342 | A1 | 8/2012 | Jeanne | |
| 2013/0216016 | A1* | 8/2013 | Journeau | G21C 9/022 376/336 |

* cited by examiner

MITIGATION ASSEMBLY FOR NUCLEAR REACTOR COMPRISING A REMOVABLE SEALING PLUG

TECHNICAL DOMAIN

This invention relates to the field of nuclear reactors, particularly fast breeder reactors (FBR) and particular of the integrated or loop type. Such reactors can be cooled by a heat transporting fluid, typically in the form of a liquid metal, and especially sodium. The terms sodium-cooled fast reactor, or SFR (Sodium Fast Reactor) are also used. This type of sodium-cooled fast reactor belongs to the family of so-called fourth generation of nuclear reactors.

More precisely, the invention relates to the design of an "Upper Neutron Shielding" (UNS) of a mitigation assembly.

The invention thus discloses a mitigation assembly for a nuclear reactor comprising a removable sealing plug, a nuclear reactor comprising such an assembly, and an associated operating method.

STATE OF PRIOR ART

The operating principle of fast breeder nuclear reactors has now been known for several years. Thus, a fast breeder nuclear reactor is a nuclear reactor that uses fast neutrons (that have a kinetic energy of more than 0.907 MeV), in opposition to thermal neutrons (that have a kinetic energy of less than 0.025 eV). Also, unlike classical second and third generation nuclear reactors, the core of a fast breeder nuclear reactor is not moderated (no deceleration or thermalisation of neutrons).

Moreover, although other technologies have been studied, the vast majority of fast neutron nuclear reactors use liquid sodium as cooling fluid, particularly because it has a high boiling point.

Sodium-cooled nuclear reactors usually comprise a vessel in which the core is located, with a core control plug above the plug. The core is generally composed of a large number of fuel assemblies surrounded by fertile assemblies, reflector and neutron protection assemblies, and sometimes serious accident mitigation assemblies. Heat is extracted using pumping systems to circulate sodium in the core. This heat is transferred to an intermediate circuit, through one or several intermediate exchangers (IE), before being used to produce steam in a steam generator (SG). This steam is then turbined to transform it into mechanical energy, which in turn will be transformed into electrical energy.

The intermediate circuit contains sodium. Due to the violent reactions that can take place between sodium and water-steam that can occur in the case of a break of a steam generator tube, the purpose of this circuit is to isolate primary sodium (in the vessel) from the water-steam contained in the steam generator. This architecture comprises two circuits containing sodium (one primary circuit designed to transfer heat between the core and an intermediate heat exchanger, and the other called the secondary circuit designed to transfer heat from the intermediate heat exchanger to the steam generator.

All sodium reactors have technical characteristics in common. The vessel is closed by a closing slab such that the primary sodium does not come into contact with external air. All components (exchangers, pumps, pipes, etc. . . . ) pass through this slab vertically so that they can be removed by lifting them vertically using a lifting device. The dimensions of the holes passing through this slab depend on the size and the number of components. The diameter of the vessel will increase as the holes become larger and more numerous.

The primary circuit can be arranged according to one of two large families. Thus, among fast breeder reactors, a distinction is made between "integrated" reactors and "loop" reactors. Note that this invention preferentially relates to integrated type fast breeder reactors, but is equally applicable to loop fast breeder reactors.

Loop reactors are characterised by the fact that the intermediate exchanger and primary sodium pumping devices are located outside the reactor vessel. FIG. 1 is a axial section illustrating the design principal of a sodium-cooled fast breeder nuclear reactor called a "loop" reactor.

In the loop reactor R in FIG. 1, sodium passes through the core 1 in the upwards direction to carry away the calories produced. At the exit from the core 1, it opens up into zone 2 of the vessel 3 of the reactor R. This zone is currently called the "hot collector". In each loop, a pipe 4 dips into the hot collector 2 to draw in primary sodium and carry this sodium to the intermediate exchanger, not shown on the figure, where it will transfer heat to the secondary sodium. At the outlet from the intermediate exchanger, the primary sodium is recovered by a pump and is sent directly to the core inlet through a pipe 5.

The main advantage of the loop design is that for a given power, the diameter of the reactor vessel can be smaller than that possible with an integrated reactor because it contains fewer components. Therefore the reactor vessel is more easily fabricated and therefore less expensive. On the other hand, a loop design has the disadvantage that it brings the primary sodium outside the reactor vessel which results in a more complicated architecture of the primary circuit, causing major safety problems. Thus, gains related to the small size and the easier constructability of the reactor vessel are cancelled out by additional costs induced by the addition of devices related to the design of loops and special means for managing primary sodium leaks.

Integrated design reactors are characterised by the fact that intermediate exchangers and primary sodium pumping means are located in the reactor vessel, which means that there is no need for the primary circuit to go outside the reactor vessel which therefore confers an important safety advantage on this family of solutions in comparison with the loop solutions family. FIG. 2 is an axial section illustrating the design principal of a sodium-cooled fast breeder nuclear reactor called an "integrated" type.

In the integrated reactor R in FIG. 2, sodium passes through the core 11 in the upwards direction to carry away the calories produced. At the exit from the core 11, it opens up into zone 12 of the reactor vessel 13 closed off by the closing slab 24. This zone 12 is frequently called the "hot collector". This hot collector 12 is separated from another zone 14 called the "cold collector" by a generally cylinder-cone shaped wall 14 called the "redan". The intermediate exchanger 16 composed of a bundle of tubes, not shown on the figure, passes through the redan 15. Primary sodium enters into the intermediate exchanger 16 through inlet windows 17 located in the hot collector 12. As it passes along the tubes, it transfers its heat to the secondary sodium and exits from the intermediate exchanger 16 through windows 18 in the lower part of the intermediate exchanger 16 located in the cold collector 14. Secondary sodium enters into the intermediate exchanger 16 through the pipe 28 and exits through the pipe 29. Sodium in the cold collector 14 is recovered by a pumping device 19 and is sent directly to the inlet of the reactor core 11 through the diagrid 30 that supplies the assemblies. The diagrid 30 is a box under pressure into which the different fuel, fertile, reflector, neutron protection or mitigation assemblies, engage vertically. The diagrid 30 is supported by the mechanical support structure called the plating 31.

Sodium is circulated in the intermediate exchanger 16 by gravity between the hot collector and the cold collector 14. This driving force of sodium between the two manifolds is fixed at about 2 m corresponding to the difference between the level 20 of the hot collector 12 and the level 21 of the cold collector 14, for reasons related to the design of the intermediate exchanger 16 and the geometric footprint. To maximise efficiency, the components that pass through the redan 15, the intermediate exchanger 16 and the pumping means have the highest possible leak tightness at these crossings 22 and 23 to prevent the primary sodium from bypassing the intermediate exchanger 16.

Furthermore, in a manner known in itself and as mentioned above, a fast breeder nuclear reactor can integrate mitigation assemblies, also called DCS-M-TT for "Complementary Mitigation type Safety Device with Through Tubes", the function of which is to mitigate generalised fusion accidents in the reactor core by creating a corium evacuation path from the core to a recuperator located under the plating 30 at the bottom of the reactor vessel. For example, the fourth generation reactor called ASTRID comprises 21 mitigation assemblies that are surrounded by either 6 fuel assemblies for those placed in the core, or 3 fuel assemblies and 3 reflectors for those places in the first ring of the core. The upper part of such a mitigation assembly comprises a neutron shielding device usually called the "Upper Neutron Shielding" (UNS).

FIG. 3 is a diagrammatic sectional view showing an example of a mitigation assembly 40 used in a fast breeder nuclear reactor. Such an assembly 40 is elongated in shape along a longitudinal axis X. It comprises a tube or box 41 with a hexagonal section, the upper portion 42 of which forms the head of the assembly and that usually surrounds a UNS. The tube 41 also comprises a central portion 43. In other words, the portions 42 and 43 form a single tubular casing 41 or box with identical hexagonal cross-section over its entire height. The head 42 of the assembly comprises a central opening 45 opening up inside the tube 41. Finally, the assembly 1 comprises a lower portion 44 forming the foot of the assembly, along the prolongation of the tube 41. The bottom 44 of the assembly comprises a distal end 47 that will be inserted vertically into the diagrid of a reactor core.

As can be seen on FIG. 3, the section of the foot 44 of the assembly 40 is smaller than the hexagonal section of the tube 41 of the assembly 40. The connection 47 between these two sections 41 and 44 forms a more or less rounded or conical shoulder to be able to make an unsealed sphere/cone bearing type connection with the top face of the diagrid of the reactor core.

The central portion 43 is at the level of what is usually referred to as the fissile zone Z of the core, that is approximately at mid-height of the assembly 40. In the installed configuration of a mitigation 40 assembly, in other words in the loaded position in a reactor core, the male-shaped foot 44 of the assembly 40 is inserted into an opening in the diagrid of the reactor, thus holding the assembly 40 in place in this diagrid with its longitudinal X axis being vertical.

As mentioned above, the function of the mitigation assemblies 40 is the mitigation of generalised core fusion accidents. Thus, the tube 41 forms a relocalisation channel and then a corium flow channel towards the recuperator located at the bottom of the reactor core. The foot 44 of the assembly 40 carries the corium flow by gravity. More precisely, corium generated by fusion of the fuel is propagated radially inside the core until it reaches the mitigation assemblies 40. The corium evacuation channel opens up due to melting of the hexagonal tubes of the assemblies 40.

However, a problem arises with the thermohydraulics of the reactor boiler that necessitates a new design of the UNS that is compatible with the main function of the mitigation assemblies, namely the corium flow path.

Thus, FIG. 4 is an axial section illustrating a fast breeder nuclear reactor R comprising the mitigation assembly 1 in FIG. 3. The dashed line N in this FIG. 4 represents the free level of sodium.

All core assemblies, in this case the fuel assemblies 50 and the mitigation assemblies 40, are inserted vertically through their feet into stands or tubes 51 and 48 respectively in the diagrid 30. The function of the diagrid 30 is to supply the assemblies that require good cooling with cold sodium at high pressure. The stands of the fuel assemblies are thus perforated to enable supply of the assembly with cold sodium, the stands of the mitigation assemblies are not perforated because this assembly does not require cooling by forced convection. The temperature of the diagrid 30 is about 400° C. and its pressure is about 4 bars.

More specifically concerning the mitigation assemblies 40, the stands 48 prolong in a leak tight manner through the plating 31, at a temperature of about 400° C. and a pressure of about 130 mbars, with the function of supporting the core and the diagrid to open up under the plating 31 into the cold collector 14 at low pressure, at a temperature of about 400° C. and a pressure of about 0 bars, at the bottom of which lies the corium recuperator 60. The top part of the foot of assemblies supplied with cold sodium comprises a labyrinth seal with the stand that isolates the high pressure diagrid 30 from the hot collector 12, and the bottom part comprises a labyrinth seal with the stand that isolates the high pressure diagrid 30 from the plating 31.

It is then observed that in this design, in other words with no added head loss between the head and the foot of the assembly, the function of the assembly 40 requires that the hot collector 12 at a temperature of about 550° C. and a pressure of about 130 mbars, has to be in contact with the cold collector 14. The pressure difference of about 130 mbars between them causes a downwards flow of hot sodium inside the tube 41 as far as inside the cold collector 14.

However, the injection of hot sodium at about 550° C. into the structures (diagrid, plating, etc.) located in the cold sodium at about 400° C., is not desirable for their mechanical strength and ageing (thermomechanical stresses due to temperature gradients). In particular, it must be possible to justify a life for these structures equal to the life of the power plant containing the reactor, for example almost 60 years.

Furthermore, it is known that the free surface of sodium in the hot collector 12 is one of the main sources of gassing of the hot collector 12. These bubbles dissolve in sodium in the hot collector 12 due to the high temperature effect, with a risk of seeing this gas regerming (nucleation phenomenon) and reforming bubbles if it passes into the cold collector 14. However, the presence of gas in the cold collector 14 must be limited to prevent the risk of gas passing into the assemblies, a phenomenon that could lead to a cooling fault of the fuel rods.

Consequently there is a need to provide a good seal between the hot collector 12 and the cold collector 14, while remaining compatible with other constraints related to operation and the installation, particularly for washing and loading the assembly in the core. Known UNS solutions, for example used in fuel assemblies or reflectors that are fixed UNS composed of absorber rods or sleeves (ring with central channel) cannot satisfy this leak tightness requirement, since the cross-section for the passage of sodium is significant to provide good cooling of the absorber elements.

Presentation of the Invention

The purpose of the invention is thus to at least partially overcome the needs described above and the disadvantages of embodiments according to prior art.

Thus, according to one of its aspects, the purpose of the invention is a mitigation assembly for a nuclear reactor, comprising a box with a longitudinal axis designed to be inserted vertically in the diagrid of the reactor, the box comprising a central portion in which corium circulates and an upper portion forming the head of the assembly housing an upper neutron shielding device, that comprises an upper neutron shielding head supporting neutron absorbers, and comprising removable locking means with the box and a slug forming part of the upper neutron shielding head, the slug being free to move in translation relative to the remaining part of the upper neutron shielding head over a given travel distance, the locking means being configured such that locking and unlocking between the upper neutron shielding head and the box can be made by displacement of the slug along the longitudinal axis by means of a grab for extraction of the upper neutron shielding device using the pawls of the grab attached in the slug, characterised in that the upper portion of the mitigation assembly also comprises a cone-shaped sealing block with the tip of the cone oriented towards the bottom of the box, cooperating with a cone-shaped internal surface of the box, a sealing device being formed between the sealing block and the internal surface of the box, the assembly comprising the upper neutron shielding head and the sealing block forming a removable sealing plug of the mitigation assembly.

Preferably, the mitigation assembly is designed for use in a fast breeder reactor, and particular a sodium-cooled fast reactor (SFR). However it can be used for any nuclear reactor requiring a sealing function, for example such as a gas-cooled or liquid metal-cooled reactor, the liquid metal being chosen from among lead and lead-bismuth.

Furthermore, the mitigation assembly according to the invention can equally be used in an integrated type of fast breeder reactor or in a loop type fast breeder reactor.

Advantageously, the conical shape of the sealing block can facilitate positioning of the plug in the mitigation assembly, while guaranteeing a very small clearance at the seal, and therefore a good seal. The taper can also limit risks of the plug getting jammed during extraction, compared with risks with cylindrical centring.

The UNS of a mitigation assembly performs several functions described in detail below. Among the main functions, it is essential to provide a good seal at the assembly head between the hot collector and the cold collector. The leakage flow must be minimised to limit mechanical damage to the structures and to limit gassing of the cold collector. It is also necessary to generate a sufficiently large head loss to limit ejection of corium through the assembly head and to facilitate the corium flow downwards in the stands of the diagrid and the plating. Note that this second function is necessarily performed if the first function is performed.

Among the secondary functions, it is necessary to provide the upper neutron shielding, in other words to limit neutron leaks through the top of the assembly. It must also be reusable, to follow the logic of reducing the quantity of irradiated waste.

Finally, the constraints include the need to be compatible with in-core handling, in other words loading the assembly in the core or in the external storage. It must also be compatible with the assembly washing procedure.

With the invention, a quasi-leak tight removable plug type UNS can be designed for a mitigation assembly, to perform these functions. Thus, the function aiming to achieve a high head loss is automatically achieved due to the sealing function performed. The upper neutron shielding function can be performed on a limited number of mitigation assemblies by using a solid steel block that also satisfies the function of compatibility with the washing process while minimising costs.

Furthermore, the function of compatibility with core handling can be performed by arranging matters such that the plug can be removed from the mitigation assembly. If the plug were perfectly sealed and not removable, immersion of the assembly in sodium would lead to the formation of an air pocket under the plug (bell effect). Due to the invention, the plug is put into place in the assembly once the assembly has been immersed in the sodium, thus preventing any gas pocket in the assembly.

Furthermore, the function of compatibility with the washing process can also be satisfied by making sure that the plug is removable. The standard washing procedure consists of circulating wet gas through the assembly from the foot to the head, followed by complete immersion of the assembly in water. Thus, removing the plug before washing can satisfy this need.

Finally, the function to enable reuse can also be performed by arranging matters such that the plug can be removed from the assembly. Depending on the degree of irradiation of this component, it could be envisaged to have several uses in new assemblies, which could reduce the quantity of waste and minimise costs.

The mitigation assembly according to the invention may also comprise one or several of the following characteristics taken in isolation or in any technically possible combination.

The upper portion of the mitigation assembly may also comprise an intermediate sealing block located between the upper neutron shielding head and the cone-shaped sealing block the intermediate sealing block in particular being cylindrical in shape.

The cone-shaped sealing block and/or the intermediate sealing block may be made of metal, particularly stainless steel, or may contain neutron absorbers particularly such as boron carbide ($B_4C$), hafnium (Hf), hafnium diboride ($HfB_2$), titanium diboride ($TiB_2$), ferro boron (FeB), uranium dioxide ($UO_2$), rare earths, and others.

Furthermore, the sealing device may preferably comprise a labyrinth seal located on the external conical surface of the cone-shaped sealing block.

As a variant, the sealing device may comprise a seal made by means of scraper segments, particularly metallic, placed on the external surface of the cone-shaped sealing block.

The space between the cone-shaped sealing block and the cone-shaped internal surface of the box, defining the clearance of the seal, is advantageously practically zero.

Furthermore, the cone-shaped sealing block may comprise a vertex forming the nose of the sealing block with a rounded shape.

Advantageously, the rounded shape of the nose of the cone-shaped sealing block facilitates lowering it into position without damaging the sealing surface of the assembly head.

The internal surface of the box extending around the nose of the cone-shaped sealing block may also be cone-shaped.

Advantageously, the cone shape can prevent any gas retention during immersion in sodium and during washing.

The upper neutron shielding device, and particularly the upper neutron shielding head, can be as described in French patent application FR 3 030 860 A1. Thus, it can have one or several of the characteristics described below.

The assembly head may also comprise holes or a groove adapted to cooperate with the pawls of a handling grab to handle the mitigation assembly, the assembly handing grab having the same operating sequence as that of the upper neutron shielding device extraction grab.

The upper neutron shielding head may comprise a part forming a neutron absorbers plug of the upper neutron shielding device and supporting the locking means.

The locking means may also be composed of pawls installed free to pivot in a vertical plane.

Each of the pawls may be installed free to pivot on a pin fixed to the part forming a plug.

Furthermore, the slug may comprise fixed pins each adapted to slide inside a groove made in a pivoting pawl, a vertical translation movement of the slug causing the pins to slide in the grooves, thus making the pawls pivot.

The slug may also comprise a groove inside which the pawls of the upper neutron shielding device extraction grab can be attached.

The box may also comprise an internal groove in which the pawls of the locking means can be inserted so as to form an upper stop for the upper neutron shielding device.

Furthermore, the upper neutron shielding device may comprise one or several hollow columns fixed to the part forming the plug and passing though the slug, the column(s) being adapted to bear in contact with a mobile part of the upper neutron shielding device extraction grab free to move in translation, so as to apply a relative upwards displacement between the slug and other parts of the upper neutron shielding device during unlocking.

The material included in the upper neutron shielding device for mitigation assemblies is preferably chosen from among stainless steels, but may be also be chosen from among neutron absorbers particularly such as boron carbide ($B_4C$), hafnium (Hf), hafnium diboride ($HfB_2$), titanium diboride ($TiB_2$), ferro boron (FeB), uranium dioxide ($UO_2$), rare earths, and others.

Furthermore, another purpose of another aspect of the invention is a nuclear reactor, and particular a fast breeder nuclear reactor, characterised in that it comprises at least one mitigation assembly as defined above.

Furthermore, another purpose of another aspect of the invention is a method of operating a mitigation assembly as defined above, characterised in that it comprises one or several of the following steps when the assembly is immersed under sodium in position in the reactor core:

- removal of the removable sealing plug, then bleed the inside of the box,
- removal of the removable sealing plug, then make special measurements through the box, particularly for plating inspection measurements and/or physical measurements of the reactor core.

For example, if it is suspected that gas has accumulated inside the box during irradiation, the mitigation assembly can be bled periodically, for example during a handling operation, by lifting the removable sealing plug, for example using a special grab in the primary reactor vessel.

Moreover, if necessary, special measurements can be made inside the box for example by inserting an instrumented rod, particularly for plating inspection measurements and/or core physical measurements of the core.

The mitigation assembly, the nuclear reactor and the operating method according to the invention may comprise any one of the previously mentioned characteristics, taken in isolation or in any technically possible combination with other characteristics.

BRIEF DESCRIPTION OF THE DRAWINGS

The invention can be better understand by reading the following detailed description of a non-limitative example embodiment of the invention, and an examination of the diagrammatic and partial figures in the appended drawing on which.

In all these figures, identical references can designate identical or similar elements.

Furthermore, the different parts shown on the figures are not necessarily all at the same scale, to make the figures more easily understandable.

DETAILED PRESENTATION OF A PARTICULAR EMBODIMENT

Throughout this description, the terms "vertical", "horizontal, "lower", "upper", "bottom", "top", "under" and "above" should be understood with reference to a mitigation assembly in the vertical configuration in a nuclear reactor.

Figure 1:
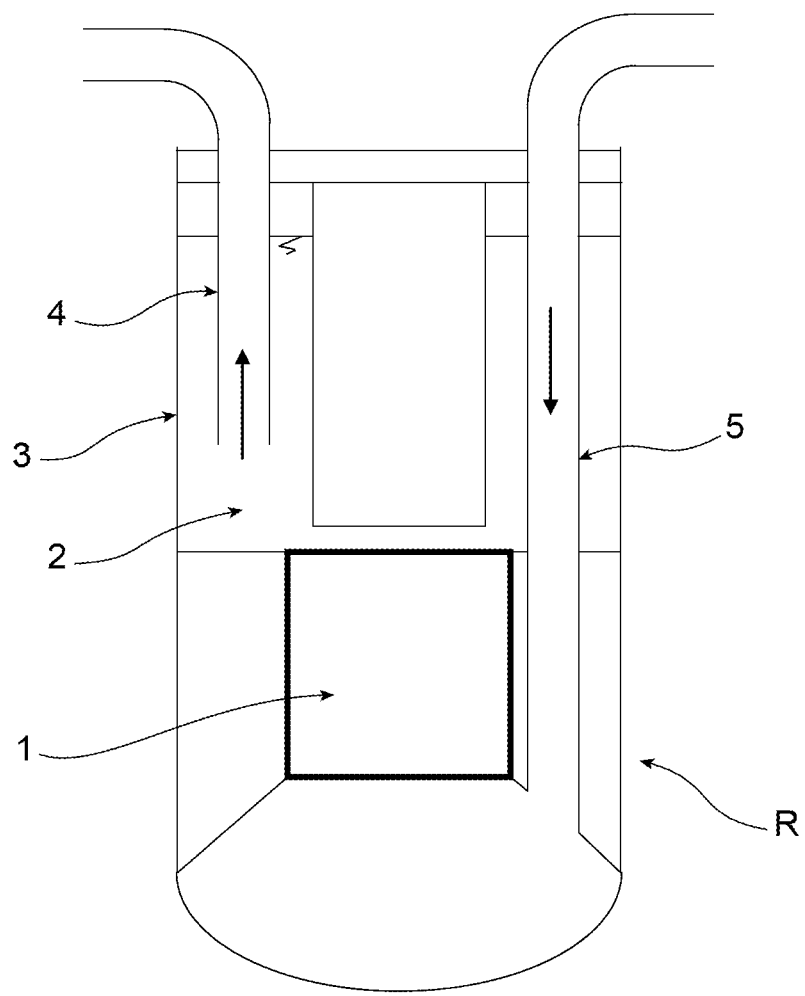
FIG. 1 is a axial section illustrating the design principal of a sodium-cooled fast breeder nuclear reactor called a "loop" type.
Figure 2:
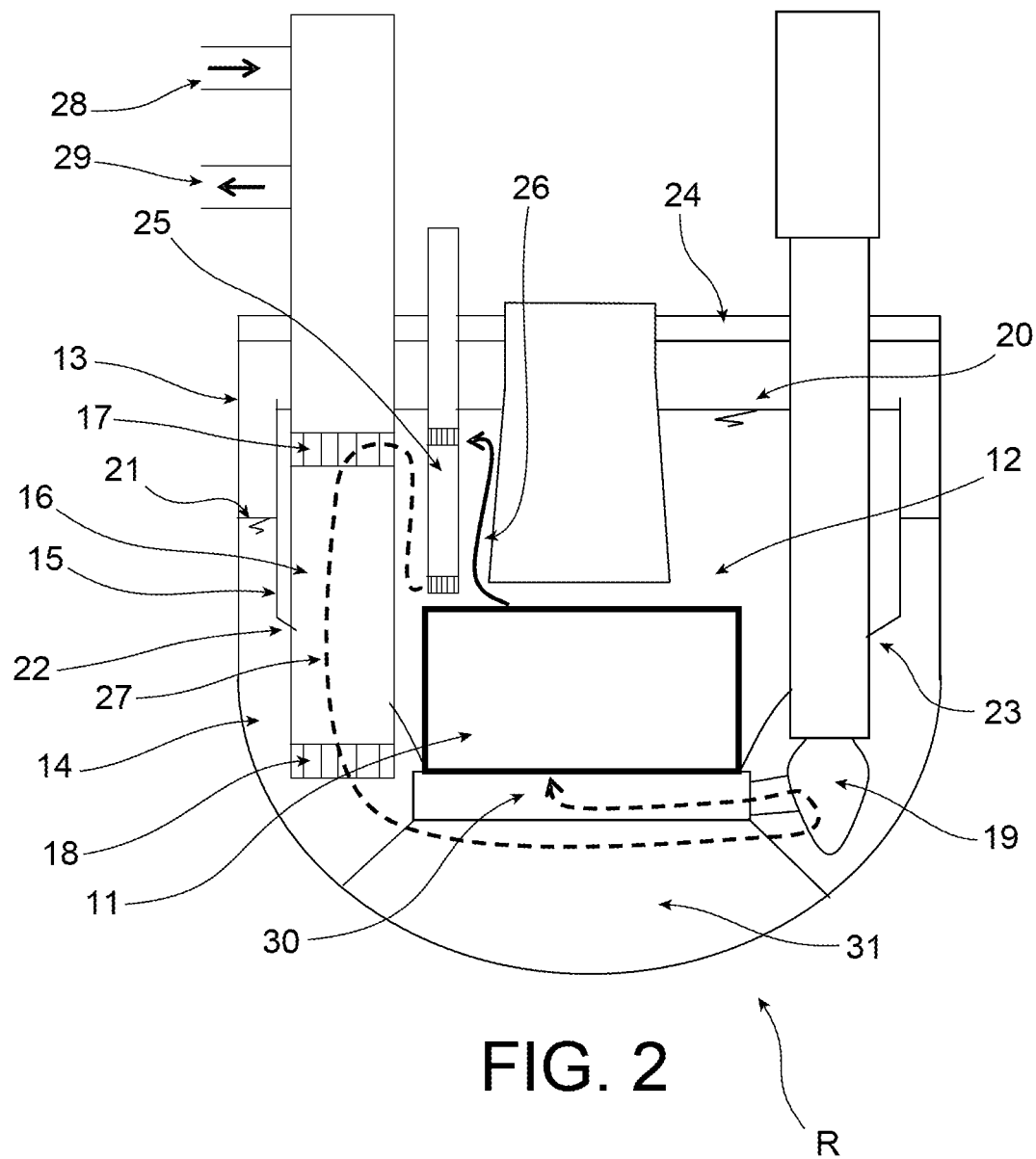
FIG. 2 is an axial section illustrating the design principal of a sodium-cooled fast breeder nuclear reactor called an "integrated" type.
Figure 3:
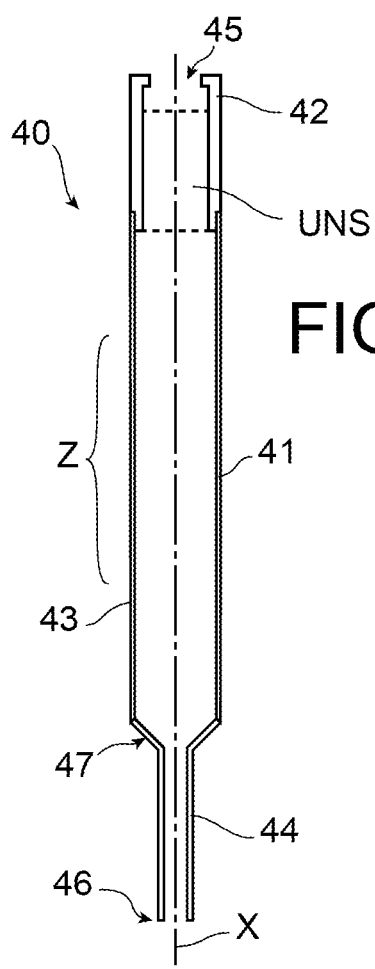
FIG. 3 is an axial sectional view illustrating an example of a mitigation assembly used in a fast breeder nuclear reactor.
Figure 4:
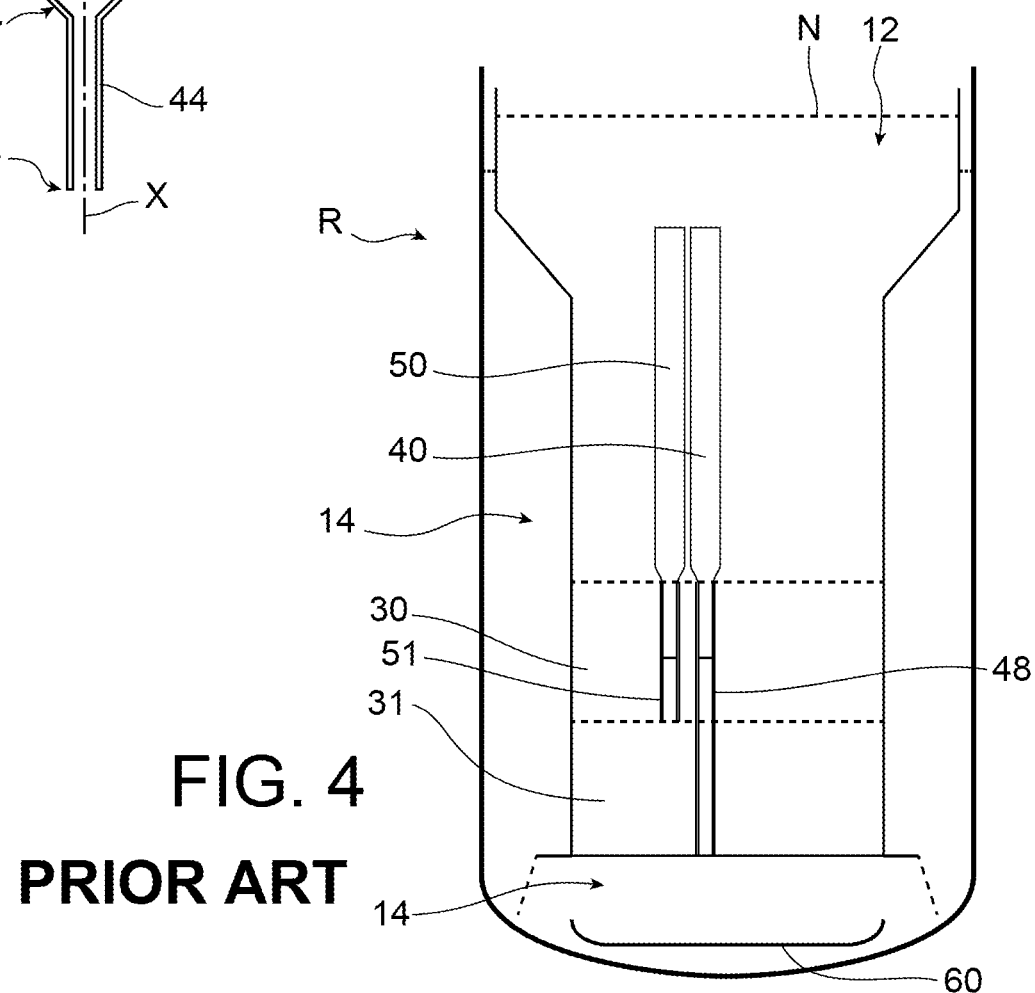
FIG. 4 is an axial section illustrating a fast breeder nuclear reactor comprising the mitigation assembly 1 in FIG. 3.

FIGS. 1 and 4 have already been described with reference to the state of prior art and the general context of the invention.

Figure 5:
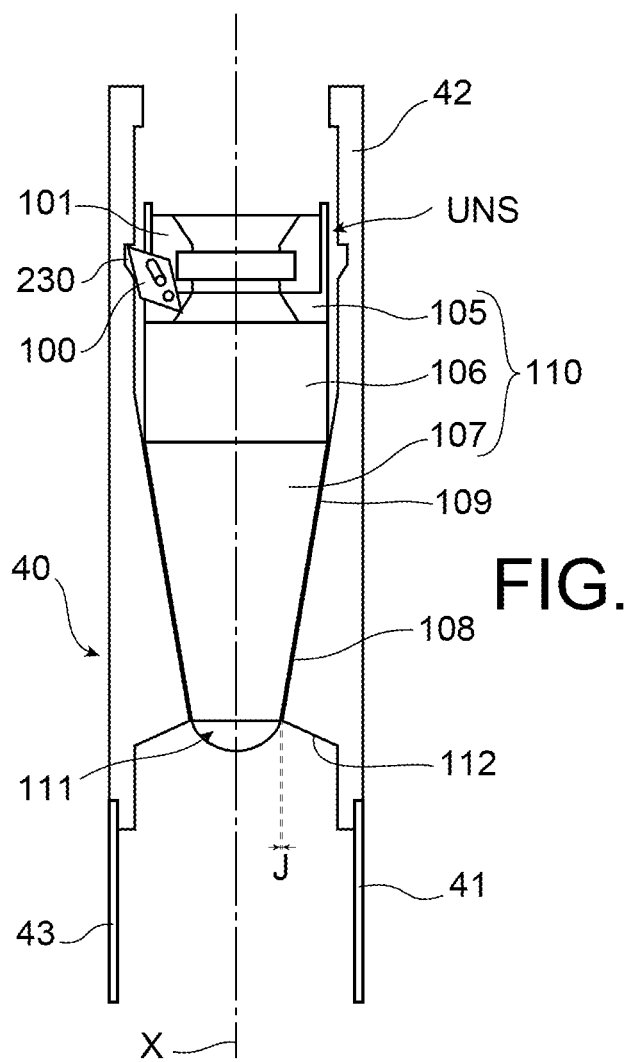
FIG. 5 is an axial sectional view illustrating the top part of a mitigation assembly for a fast breeder nuclear reactor according to the invention.
Figure 6:
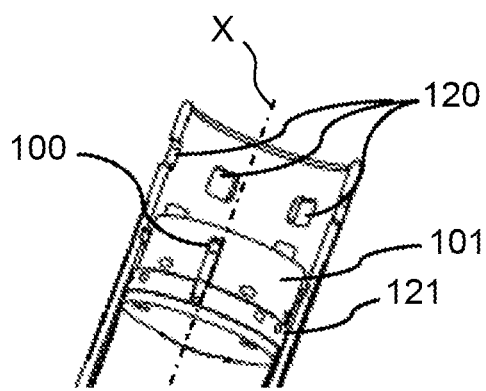
FIG. 6 is a partial longitudinal sectional view of the upper neutron shielding head of the mitigation assembly shown in FIG. 5, and FIGS. 7A to 7E are partial longitudinal sectional views illustrating the different steps in handling, insertion and locking of an upper neutron shielding (UNS) device in an example of a mitigation assembly like that in FIG. 5, the sealing blocks not being shown.

With reference to FIG. 5, the figure is an axial sectional view illustrating an example of a mitigation assembly 40 used in a sodium-cooled fast reactor R according to the invention. Elements common to FIGS. 1 to 4 and 5 will not be described again. Moreover, in the example described, the liquid metal coolant of the reactor R is sodium, although this is in no way limitative.

The mitigation assembly 40 is elongated in shape along a longitudinal X axis and comprises a box 41 with a hexagonal section, the upper portion 42 of which forms the head of the assembly and that surrounds a neutron shielding device called UNS. The assembly 40 is similar to that shown in FIG. 3, apart from its portion containing the UNS.

The box 41 also comprises a central portion 43 in which corium circulates. The UNS device comprises an upper neutron shielding head 105, partly below the blocks 106 and 107 composed of steel or that can comprise neutron absorbers, removable locking means 100 with the box 41 and a slug 101 forming part of the upper neutron shielding head 105. Thus will described below in more detail with reference to FIGS. 6 and 7A to 7E.

As will be described below, the slug 101 is installed free to move in translation relative to the remaining part of the upper neutron shielding head 105 along a given movement path, the locking means 100 being configured such that locking and unlocking between the upper neutron shielding head 105 and the box 41 can be made by displacement along the longitudinal axis of the slug 101 using an extraction grab 102 of the UNS device with the pawls 103 of the grab attached in the slug 101.

Furthermore, according to the invention, the upper portion of the mitigation assembly 40 comprises a cone-shaped sealing block 107 oriented towards the bottom of the box 41 cooperating with an internal cone-shaped surface 108 of the box 41. Furthermore, the upper portion 42 of the mitigation assembly 40 may also comprise an intermediate sealing block 106 located between the upper neutron shielding head 105 and the cone-shaped sealing bock 107, the intermediate sealing block 106 being cylindrical in shape. The cone-shaped sealing block 107 and the intermediate sealing block 106 are preferably made of solid steel, but they may also comprise the neutron absorber inserted in a steel enclosure.

Moreover, a sealing device 109 is formed between the sealing block 107 and the internal surface 108 of the box 41. The sealing device 109 advantageously comprises a labyrinth seal located on the external conical surface of the conical sealing block 107. As a variant, it could comprise a seal made by means of metallic scraper segments placed on the surface of the cone-shaped sealing block.

The assembly making up the upper neutron shielding head 105, the intermediate sealing block 106 and the sealing block 107 forms a removable sealing plug 11 for the mitigation assembly 40.

Also advantageously, the space between the cone-shaped sealing block 107 and the internal cone-shaped surface 108 of the box 41, defining the clearance J of the seal 109, is advantageously practically zero to maximise leak tightness.

Moreover, the cone-shaped sealing block 107 comprises a vertex forming the nose 111 of the sealing block 107 with a rounded shape. Advantageously, the rounded shape of the nose 111 of the cone-shaped sealing block 107 facilitates lowering it into position without damaging the sealing surface of the assembly head.

Furthermore, the internal surface 112 of the box 41 extending around the nose 111 of the sealing block is also cone-shaped. Advantageously, the cone-shape can prevent any gas retention during immersion in sodium and during washing.

With reference to FIGS. 6 and 7A to 7E, we will now describe the upper neutron shielding head 105 that may be similar to that described in French patent application FR 3 030 860 A1.

The head of the assembly 42 comprises a continuous internal groove 230 made inside the box 41. Furthermore, as illustrated on FIGS. 6 to 7E, the assembly head 42 comprises holes 120 distributed at regular angular intervals and each of which is adapted to cooperate with a pawl of an assembly handling grab as described below. The UNS head 105 also comprises a plug 121 and above the plug 121, a slug 101 forming the head of the UNS. The slug 101 is installed free to translate relative to the plug 121 but only over a given travel distance, internal stops in plug 121 and in the slug 101 composed of shoulders 240, 241 cooperating with each other to hold them firmly together once the travel distance has been reached. The slug 101 has a continuous internal groove 226 adapted to cooperate with the pawls of a UNS extraction grab as explained below. Finally, the slug 101 integrates three fixed pins 224.

The UNS head 105 also comprises locking pawls 100 installed to pivot about a pin 223 fixed to the plug 121 such that pivoting of the pawls 121 takes place in vertical planes. There are three locking pawls 100 distributed at 120° from each other. It is obvious that a different number of pawls can be used, preferably at a regular angular spacing around the periphery of the ring 101. Each pawl 100 comprises a locking end 250 adapted to cooperate with a continuous internal groove 230 made in the box 41, and a hollowed out groove 225, that is oblique shaped in the example illustrated. The installation free in translation enables each fixed pin 224 to slide inside a groove 225 when the slug 101 is brought towards the plug 121, causing pivoting of the pawl 100 in a vertical plane towards the outside of the UNS head 105 so as to insert the pawl 100 in the internal groove 230 of the box 41, as described in detail below. The slug 101 then supported on the pawls 100 through the pins 224 prevents them from pivoting towards the inside of the UNS and locks them in position in the groove.

Figure 7A:
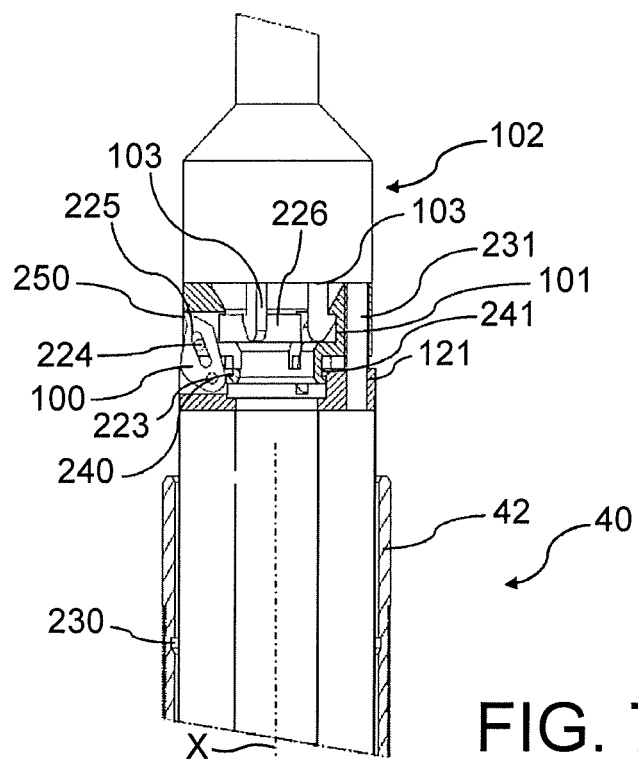
Figure 7B:
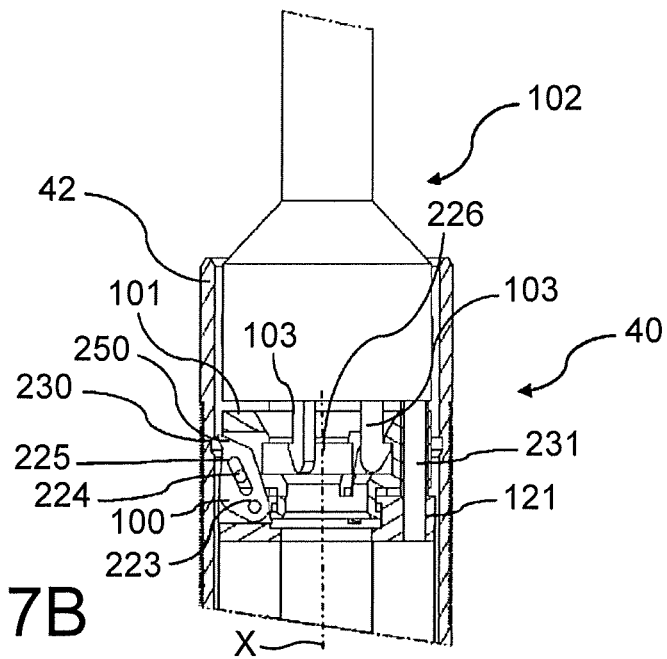

Thus, when the UNS head 105 in a mitigation assembly 40 is in a locked position as illustrated in FIGS. 6, 7C, 7D and 7E, the bottom part of the UNS head 105 is supported by sealing blocks 106, 107, so that the head 105 is retained laterally thus preventing any downwards translation, and it is locked in the top part, in other words by its slug 101 by insertion of the pawls 100 in the groove 230 of the assembly head 41, which blocks all upwards translation. Advantageously, one or several hollow columns 231 are laid out and fixed on the plug 121 passing through the slug 101, as can be seen on FIGS. 7A to 7E. Preferably, there are three of these columns 231 distributed at 120° from each other. It is obvious that a different number of columns 231 can be used, preferably at a regular angular spacing around the periphery of the plug 121. In the position at which the separation between the plug 121 and the slug 101 is maximum as illustrated in FIG. 7A, these columns project from it. Each of these hollow columns 231 performs the following functions:—it forms a sliding link between the plug 121 and the slug 101, to maximise robustness during the relative translation movement between these two components;—it forms a vent to enable filling with corium;—it enables the head of an extraction grab 102 described below, to mechanically force pivoting of the pawls 100 during the UNS unlocking operation. Note that in the framework of the invention, the expression "extraction grab" is used to denote the gripping grab 102 of the UNS head 105 through the slug 101, because it is not intended to insert the UNS head 105 in the remainder of the assembly in the reactor vessel. In other words, the grab 102 is not intended to be used for the purposes of this insertion operation in the reactor vessel. Thus, the head of the grab 102 bears on each column 231 in order to apply an upwards relative movement between the slug 101 and the remainder of the UNS, when the UNS is unlocked from the assembly head 42, and therefore mitigates mechanical seizure phenomena that can occur after residence in sodium. In other words, due to these columns 231, unlocking safety is maintained in case of mechanical seizure. All locking/ unlocking means described are designed to minimise risks of mechanical seizure. No precise adjustments are necessary for any of the movements of the different means and large clearances can be developed between all parts. The forcing function used in case of seizure by the columns 231 can make the unlocking assembly more robust, and therefore guarantee in line extraction of the UNS out of its assembly and thereby the availability ratio of the nuclear reactor containing assemblies according to the invention.

We will now describe the lowering, insertion and locking steps of the UNS head 105 in the mitigation assembly 40 in chronological order with reference to FIGS. 7A to 7E, these steps being done using the extraction grab 102. Insertion of the UNS in the assembly with the extraction grab 120 is described to describe the operation of the locking/unlocking means. This insertion operation can also be done outside the reactor vessel, particularly in an external storage drum and is the same as the extraction operation but in the reverse order.

Figure 7C:
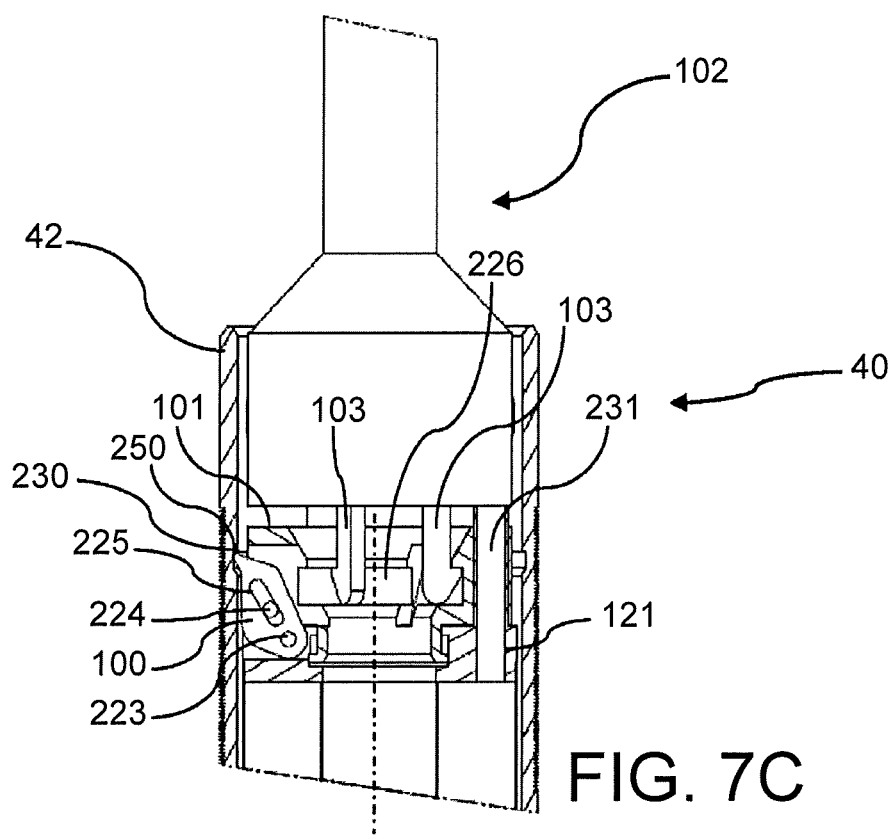
Figure 7D:
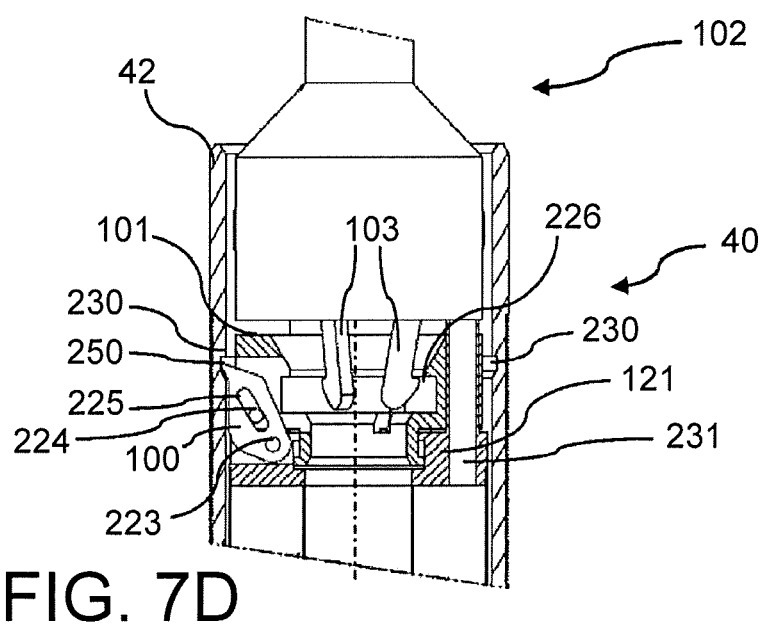

The UNS head 105 is gripped by the extraction grab 102 at the slug 101. The extraction grab 102 comprises a head in which gripping pawls 103 are installed free to pivot in a vertical plane, the grab head being installed free to move in translation relative to the pawls. The pawls 103 grip the slug 101 by insertion in their internal groove 226 and the head installed free to translate relative to the rest of the grab 102 can apply a relative axial displacement between the slug 101 and the plug 121 when the UNS head 105 is retained by the pawls 103. The first step is an approach and insertion phase during which the grab 103 inserts the UNS head 105 in the assembly 40 along its longitudinal X axis (FIG. 7A) until it come into contact with the intermediate sealing block 106. The vertical downwards translation movement of the head of the grab 102 free to move in translation is continued that thus applies an axial displacement of the slug relative to the plug 121. The stops, composed of the lower shoulder of the slug 101 and the upper shoulder of the plug 121 then move away from each other. Furthermore, the vertical downwards translation of the slug 101 forces the pawls 100 to pivot outwards because each of the pins 224 fixed on the ring 101 slide in a groove 225 corresponding to a pawl 100. When the pawls 100 have pivoted outwards, they fit into the internal groove 230 of the box 41, which prevents upwards translation of the UNS head 105 in the assembly 40, and therefore locks the UNS head 105. The downwards movement of the head of the grab 102 is continued until the slug 101 bears in contact with the plug 121 (FIG. 7C). Gripping by the grab 102 is then deactivated by pivoting the pawls 103 inwards (FIG. 7D). The grab 102 can then be removed from the mitigation assembly 40.

Figure 7E:
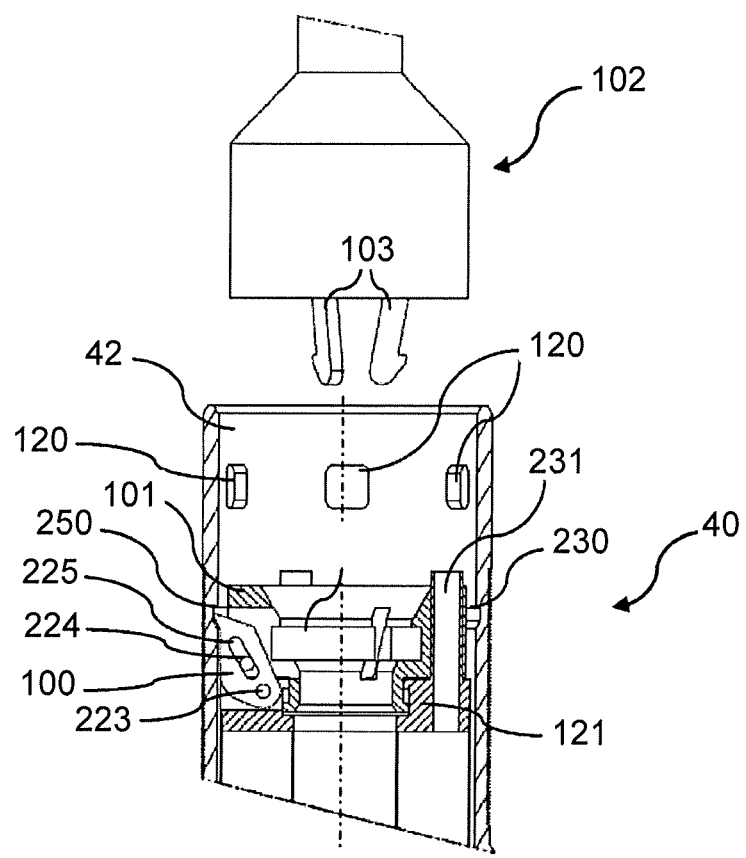

Finally, the grab 102 is raised again, the UNS head 105 being inserted and locked in the mitigation assembly 40 by means of pawls 100 inserted and maintained in the groove 230 of the box 41 (FIG. 7E). The weight of the slug 101 guarantees that the UNS head 105 remains locked in the assembly head 42 despite the upwards thrust that can be generated by exceptional situations such as a vertical earthquake or a gas bubble moving upwards in the box.

We will now describe the chronological steps for locking and unlocking the UNS head 105 outside the mitigation assembly 40. In the locked position as illustrated on FIG. 7E, the slug 101 is kept in contact on the plug 121 and the columns 213 project from the slug 101. The projection height is chosen to be slightly less than the maximum relative axial displacement between the slug 101 and the plug 121.

The handling grab 102 is lowered until the head free to move in translation bears on the columns 231. After the slug 101 has been gripped by the pivoting pawls 103 of the grab 102 inserted in the groove 226, the slug 101 can be moved in a relative upwards translation relative to the plug 121 therefore causing the locking pawls 100 to pivot inwards. This pivoting is induced by the pins 224 sliding in the grooves 225. The pawls 100 are then extracted from the groove 230 of the box 41 and the UNS head 105 is unlocked from the remaining part of the mitigation assembly 40. When the upper transverse plane of the columns 231 reaches the upper transverse plane of the slug 101, the head free to move in translation can no longer impose a relative axial displacement between the slug 101 and the plug 121. Then, only the upwards translation of the grab 102 makes it possible to continue extraction of the slug 101 until the shoulder 204 formed near the bottom of the slug 101 stops in contact with the shoulder 241 in the upper part of the plug 121. The UNS head 105 is then raised by the grab 102 and is then extracted outside the assembly 40.

Obviously, the invention is not limited to the example embodiment that has just been described. An expert in the subject can make various modifications to it.

The invention claimed is:

1. A mitigation assembly for a nuclear reactor, comprising a box with a longitudinal axis, the box comprising a central portion in which corium circulates and an upper portion housing an upper neutron shielding device, wherein the upper neutron shielding device comprises an upper neutron shielding head supporting neutron absorbers, wherein the upper neutron shielding device comprises removable locking means configured to cooperate with the box, wherein the upper neutron shielding device comprises a slug being free to move in translation over a given travel distance, the locking means being configured to lock and unlock the upper neutron shielding head with the box by displacement of the slug along the longitudinal axis with a grab for extraction of the upper neutron shielding device with pawls of the grab attached in the slug, wherein the upper portion of the box also comprises a cone-shaped sealing block with the tip of the cone oriented towards the bottom of the box, cooperating with a cone-shaped internal surface of the box, a seal being formed between the sealing block and the internal surface of the box.

2. The assembly according to claim 1, wherein the upper portion of the box also comprises an intermediate sealing block located between the upper neutron shielding head and the cone-shaped sealing bock.

3. The assembly according to claim 2, wherein the cone-shaped sealing block and/or the intermediate sealing block are made of metal or contain neutron absorbers.

4. The assembly according to claim 1, wherein the space between the cone-shaped sealing block and the internal cone-shaped surface of the box is zero.

5. The assembly according to claim 1, wherein the tip of the cone of said cone-shaped sealing block has a rounded shape.

6. The assembly according to claim 1, wherein the locking means are composed of other pawls installed free to pivot in a vertical plane.

7. The assembly according to claim 6 wherein the box comprises an internal groove in which the pawls of the locking means can be inserted to form an upper stop for the upper neutron shielding device.

8. The assembly according to claim 1, wherein the slug comprises an internal groove in which the pawls of the grab can be attached.

9. The assembly according to claim 1, wherein the upper neutron shielding device comprises one or several hollow columns passing through the slug.

10. A nuclear reactor, comprising at least one mitigation assembly according to claim 1.

* * * * *